(12) United States Patent
Park et al.

(10) Patent No.: US 9,306,288 B2
(45) Date of Patent: Apr. 5, 2016

(54) SMALL ANTENNA APPARATUS AND METHOD FOR CONTROLLING THE SAME

(71) Applicant: Samsung Electronics Co. Ltd., Suwon-si, Gyeonggi-do (KR)

(72) Inventors: Jungsik Park, Bucheon-si (KR); Sooung Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 13/727,205

(22) Filed: Dec. 26, 2012

(65) Prior Publication Data
US 2013/0184038 A1 Jul. 18, 2013

(30) Foreign Application Priority Data

Jan. 13, 2012 (KR) .................. 10-2012-0004448

(51) Int. Cl.
| | |
|---|---|
| *H01Q 11/12* | (2006.01) |
| *H04B 1/04* | (2006.01) |
| *H04B 1/18* | (2006.01) |
| *H01Q 9/16* | (2006.01) |
| *H01Q 1/24* | (2006.01) |
| *H01Q 9/14* | (2006.01) |
| *H01Q 9/42* | (2006.01) |
| *H04W 88/02* | (2009.01) |

(52) U.S. Cl.
CPC ............ *H01Q 9/16* (2013.01); *H01Q 1/243* (2013.01); *H01Q 9/145* (2013.01); *H01Q 9/42* (2013.01); *H04W 88/02* (2013.01); *H04B 1/0458* (2013.01); *H04B 1/18* (2013.01)

(58) Field of Classification Search
CPC .......... H01Q 9/145; H01Q 1/243; H01Q 9/42
USPC ......... 455/129, 193.1, 193.2, 193.3, 121, 269
See application file for complete search history.

(56) References Cited

U.S. PATENT DOCUMENTS

| | | | |
|---|---|---|---|
| 5,861,854 | A | 1/1999 | Kawahata et al. |
| 6,040,806 | A | 3/2000 | Kushihi et al. |
| 2003/0060227 | A1 | 3/2003 | Sekine et al. |
| 2004/0222925 | A1 | 11/2004 | Fabrega-Sanchez et al. |
| 2006/0094458 | A1 | 5/2006 | Kitaji |
| 2006/0139218 | A1 | 6/2006 | Jang |
| 2007/0146221 | A1 | 6/2007 | Oshiyama et al. |
| 2007/0285326 | A1* | 12/2007 | McKinzie ................... 343/746 |
| 2007/0285335 | A1 | 12/2007 | Bungo et al. |
| 2009/0231220 | A1 | 9/2009 | Zhang et al. |
| 2010/0105425 | A1 | 4/2010 | Asokan |
| 2011/0210897 | A1 | 9/2011 | Byun et al. |
| 2011/0256841 | A1 | 10/2011 | Kakuya et al. |
| 2011/0281532 | A1 | 11/2011 | Shin et al. |
| 2012/0280890 | A1 | 11/2012 | Kusumoto |

FOREIGN PATENT DOCUMENTS

| | | |
|---|---|---|
| CN | 1171640 A | 1/1998 |
| CN | 1197309 A | 10/1998 |
| CN | 1770642 A | 5/2006 |
| CN | 1926720 A | 3/2007 |
| CN | 102197601 A | 9/2011 |
| EP | 2 328 233 A2 | 6/2011 |
| JP | 56-27507 A | 3/1981 |
| JP | 2006-093990 A | 4/2006 |
| KR | 10-2009-0085321 A | 8/2009 |
| KR | 10-2009-0111519 A | 10/2009 |
| WO | 2011-086723 A1 | 7/2011 |

* cited by examiner

*Primary Examiner* — Nguyen Vo
(74) *Attorney, Agent, or Firm* — Jefferson IP Law, LLP

(57) ABSTRACT

An antenna apparatus for a mobile terminal is provided. The antenna apparatus includes an antenna pattern, a first electric circuit and a second electric circuit respectively connected between both ends of the antenna pattern and a system ground, and a third electric circuit disposed between the antenna pattern and a feeding line, wherein the first electric circuit and the second electric circuit extend electrical wavelengths of the antenna pattern and the third electric circuit increases input impedance matching.

15 Claims, 13 Drawing Sheets

SMALL ANTENNA APPARATUS AND METHOD FOR CONTROLLING THE SAME

PRIORITY

This application claims the benefit under 35 U.S.C. §119 (a) of a Korean patent application filed on Jan. 13, 2012 in the Korean Intellectual Property Office and assigned Ser. No. 10-2012-0004448, the entire disclosure of which is hereby incorporated by reference.

BACKGROUND OF THE INVENTION

1. Field of the Invention

The present invention relates to small antenna technology using circuit resonance instead of wave resonance by using a predetermined pattern that may be printed or made of an iron structure, or any other suitable material, printed on a Printed Circuit Board (PCB) and/or formed on a tool such as a carrier and an electric circuit connected thereto in order to decrease a spatial constraint and a cost and shorten a development period in a mobile terminal supporting various additional functions such as Global Positioning Service (GPS), Bluetooth (BT), WiFi, and other similar and/or suitable functions.

2. Description of the Related Art

Generally, a mobile terminal may include various kinds of wireless communication units in order to perform wireless communication functions. In addition, the wireless communication units may perform the wireless communication functions using an antenna corresponding thereto. Currently, the mobile terminal may include a communication unit such as a Long Term Evolution (LTE) communication unit, a Wideband Code Division Multiple Access (WCDMA), and any other similar and/or suitable type of communication unit, for wireless communication with a base station, a communication unit such as a WiFi communication unit, a Wireless Broadband (Wibro) communication unit, a Worldwide Interoperability for Microwave Access (Wimax) communication unit, and any other similar and/or suitable type of communication unit, for connection with the Internet network, a communication unit such as a Bluetooth communication unit, a Near-Field Communication (NFC) unit, and any other similar and/or suitable type of communication unit, for near field communications and/or short range communications, a GPS receiving unit, and any other similar and/or suitable communication unit. The communication units as described above may include antennas for performing the wireless communication using Radio Frequency (RF) communication with objects external to the mobile terminal. That is, the current mobile terminal may include a plurality of antennas for performing the wireless communication functions. Therefore, the antenna should be miniaturized and/or have a small size thereof in order to mount the plurality of antennas to the mobile terminal.

A Planar Inverted F Antenna (PIFA) is a type of a small antenna. In the case of the PIFA type used in the mobile terminal, ¼ wavelength of usable frequency is needed. For example, in the case of a GPS antenna, which has a frequency band of 1.575 GHz, a physical length of 4.7 cm in the air is needed, and in the case of an LTE antenna, which has a frequency band of 700 MHz band, a physical length of 10.7 cm in the air is needed. Therefore, since the mobile terminal of the related art should support various wireless communication functions including the plurality of antennas, there is a problem that the plurality of antennas may occupy a significant space of the mobile terminal. Accordingly, there is a limitation in manufacturing mobile terminals having a plurality of antennas and a small size. In addition, since resonance of the antenna may be determined by the physical length of the antenna, a longer amount of time may be needed for tuning at the time of manufacturing design and development steps, such as a modification of a mold and the like.

Therefore, a need exists for a system and method for small antenna technology using circuit resonance instead of wave resonance.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a small antenna apparatus using circuit resonance instead of wave resonance by connecting an electric circuit to the antenna apparatus. Here, the small antenna may be a metal structure having a predetermined pattern printed on a Printed Circuit Board (PCB) or formed on a tool such as a carrier.

Another aspect of the present invention is to provide a small antenna apparatus that uses an electric circuit, such as a lumped element, an inter-digital circuit, or the like, positioned on the PCB at both ends of an asymmetrical antenna pattern implemented on the PCB or at both ends of an asymmetrical antenna pattern attached to the tool and a feeding line, thereby increasing both of an electrical wavelength and an input impedance matching.

In accordance with an aspect of the present invention, an antenna apparatus is provided. The apparatus includes an antenna pattern, a first electric circuit and a second electric circuit respectively connected between both ends of the antenna pattern and a system ground, and a third electric circuit disposed between the antenna pattern and a feeding line, wherein the first electric circuit, the second electric circuit, and the third electric circuit extend electrical wavelengths of the antenna pattern in order to increase input impedance matching.

In accordance with another aspect of the present invention, a mobile terminal is provided. The mobile terminal includes an antenna apparatus including an antenna pattern, a first electric circuit and a second electric circuit respectively connected between both ends of the antenna pattern and a system ground, and a third electric circuit disposed between the antenna pattern and the feeding line, a communication unit for receiving a Radio Frequency (RF) parameter from a base station, a memory for storing a reference RF parameter therein; and a control unit for comparing the received RF parameter with the reference RF parameter and for changing a device value of a corresponding electric circuit, from among the first electric circuit, the second electric circuit and the third electric circuit of the antenna apparatus until a change value between the received RF parameter and the reference RF parameter satisfies a reference RF parameter when the comparison value is out of the reference RF parameter.

In accordance with another aspect of the present invention, a mobile terminal is provided. The mobile terminal includes an antenna apparatus including a antenna pattern, a first electric circuit and a second electric circuit respectively connected between both ends of the antenna pattern and a system ground, and a third electric circuit disposed between the antenna pattern and a feeding line, a memory for storing a reference RF parameter therein, and a control unit for measuring an RF parameter which is outputted from the antenna apparatus, for comparing the measured RF parameter with the reference RF parameter and for changing the device value of the electric circuit, from among the first electric circuit, the second electric circuit and the third electric circuit, of the antenna apparatus until a comparison value between the measured RF parameter and the reference RF parameter satisfies a reference specification when the comparison value is out of the reference specification.

In accordance with another aspect of the present invention, a method for controlling the resonance frequency of an antenna apparatus of a mobile terminal is provided. The method includes receiving an RF parameter from a base station, comparing the received RF parameter with a reference RF parameter stored in a memory of the mobile terminal, and changing the device value of a corresponding electric circuit of an antenna apparatus until a comparison value between the received RF parameter and the reference RF parameter satisfies a reference specification when the comparison value is not the reference specification. The antenna apparatus includes an antenna pattern, a first electric circuit and a second electric circuit respectively connected between both ends of the antenna pattern and a system ground, and a third electric circuit disposed between the antenna pattern and a feeding line.

In accordance with another aspect of the present invention, a method for controlling a resonance frequency of an antenna of a mobile terminal is provided. The method includes measuring a output of an antenna apparatus including an antenna pattern, a first electric circuit and a second electric circuit respectively connected between both ends of the antenna pattern and a system ground, and a third electric circuit disposed between the antenna pattern and a feeding line, comparing the measured RF parameter with a reference RF parameter stored in a memory, and changing the device value of a corresponding electric circuit of the antenna apparatus until a comparison value between the measured RF parameter and the reference RF parameter satisfies a reference specification when the comparison value is not the reference specification.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
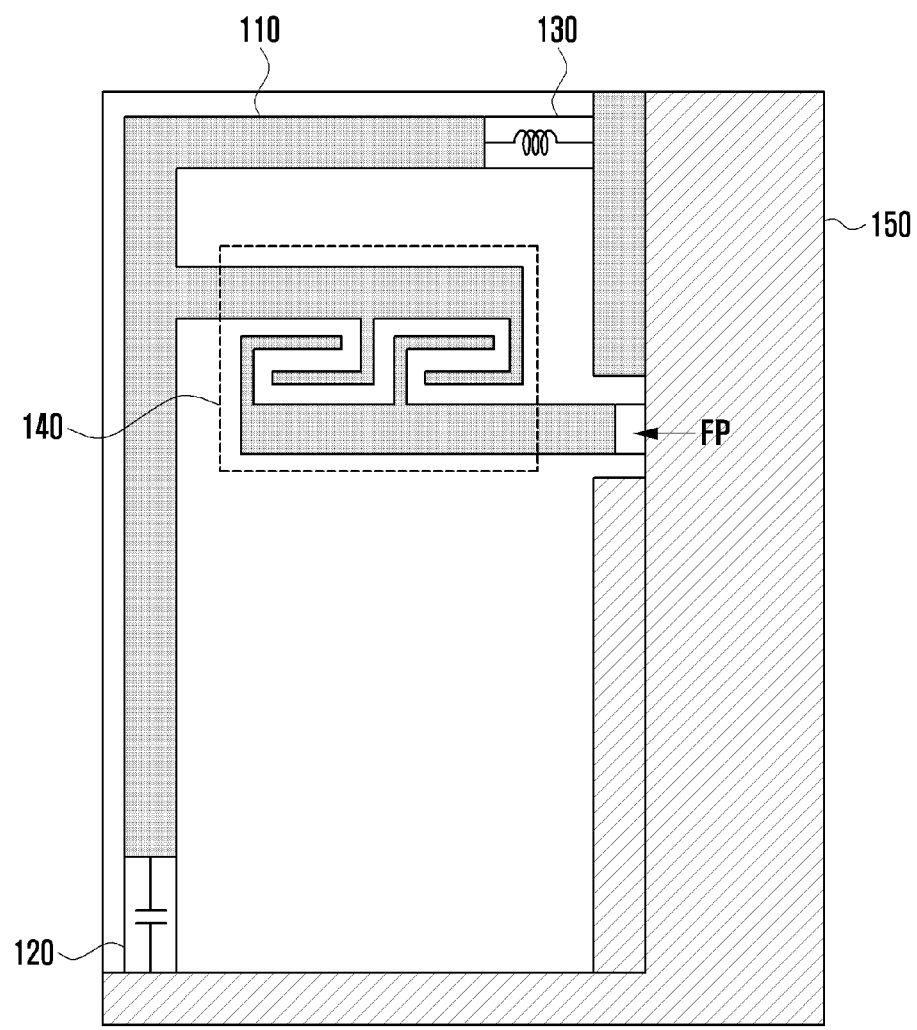
FIG. 1 is a diagram illustrating a structure of a small antenna according to an exemplary embodiment of the present invention, and illustrating a structure of a small antenna printed on a Printed Circuit Board (PCB)

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to a small antenna apparatus that may be used in a mobile terminal supporting various wireless communication functions such as Long Term Evolution (LTE), Global Positioning Service (GPS), Bluetooth (BT), WiFi, and other similar and/or suitable wireless communication services. The small antenna apparatus, according to an exemplary embodiment of the present invention, has a structure connecting an electric circuit to both ends and/or a feeding point of a predetermined pattern which may be printed and/or may be made of an iron structure or any suitable and/or similar material, formed on a tool such as a carrier or printed on a Printed Circuit Board (PCB), and may use a circuit resonance instead of a wave resonance.

The small antenna apparatus, according to an exemplary embodiment of the present invention, may use an electric circuit, such as a lumped element, an inter-digital circuit, and any other similar and/or suitable electric circuit, positioned on the PCB of the mobile terminal for both ends of an antenna pattern and/or feeding line, such that an electrical wavelength and an input impedance are simultaneously improved, thereby making it possible to save approximately 50% of a space used by the small antenna apparatus of the exemplary embodiment of the present invention, as compared to a small antenna of the related art. In addition, tuning of a resonance point of the antenna may be performed through the electric circuit connected to the antenna pattern, such that it may be unnecessary to spend time for generating a mold modification time during design and development of the small antenna apparatus according to an exemplary embodiment of the present invention, thereby making it possible to reduce a development time. In the small antenna apparatus according to an exemplary embodiment of the present invention, the feeding line may be connected to the antenna pattern through the inter-digital circuit instead of the lumped element that may generate unnecessary resonance, such that the input impedance may be increased and a tolerance of the existing lumped element may be reduced. The antenna pattern of the small antenna apparatus, according to an exemplary embodiment of the present invention, may be an asymmetrical antenna pattern implemented on the PCB or may be the asymmetrical antenna pattern attached to a tool.

As described above, the small antenna apparatus, according to an exemplary embodiment of the present invention, may have a structure in which an electric circuit may be connected to both ends of the antenna pattern and/or the feeding line to which signal is supplied. The antenna pattern may be an antenna pattern implemented on the PCB or an antenna pattern of the metal material attached to the tool. Further, the antenna pattern may be asymmetrically formed based on the feeding line in order to provide a degree of freedom in mounting. In addition, the electric circuit may be a circuit made of a combination of resistance R, inductor L, and capacitor C that is a passive device generating electrical resonance and may be a circuit made of a combination of at least one of a Field Effect Transistor (FET), a Bipolar Junction Transistor (BJT), and a diode that is an active device, and may be a circuit made of a combination of the passive device and the active device. The electric device may have a chip type or a package type and may be implemented as the inter-digital structure implemented on the PCB.

FIG. 1 is a diagram illustrating a structure of a small antenna according to an exemplary embodiment of the present invention, illustrating a structure of a small antenna printed on a PCB.

Referring to FIG. 1 the structure of the antenna apparatus may be illustrated such that a ground plane is not shown. Electric circuits 120 and 130 are connected to the both ends of an antenna 110 and the electric circuits 120 and 130 are connected to a PCB 150. A feeding line connected to a Feeding Point (FP) is connected to the antenna 110 through an electric circuit 140. Here, the electric circuit 120 is connected to a shorting point and the electric circuit 130 is connected to a radiation point. The small antenna having the above-mentioned configuration may be a PIFA type of antenna.

The Planar Inverted F Antenna (PIFA) is an antenna that may be implemented with a small size and may be embedded in the mobile terminal. As shown in FIG. 1, the PIFA may be configured to include the PCB 150 which may also be referred to as a radiation PCB 150, the antenna 110, which is a conductor printed on the PCB 150, the feeding line connected to the antenna 110 through the electric circuit 140, the electric circuits 120 and 130 connected from the both ends of the antenna 110 to the system ground (not shown) of the PCB 150. An entirety of the shape of the PIFA may have a form of the letter F. The PIFA may cover a bandwidth for a variety of mobile communication bands, such as $3^{rd}$ Generation (3G) and $4^{th}$ Generation (4G) communication bands, and any additional communication bands for features such as GPS, WiFi, Bluetooth, and the like.

When the current supplied from the PCB 150 is applied to the FP in the PIFA, as described above, the current may be transferred to the antenna 110 through the feeding line and may be radiated through the antenna 110 and electric circuits 120 and 130. Here, the antenna apparatus may form a transmission line formed of the antenna 110, the electric circuit 130, the system ground of the PCB 150 and the electric circuit 120 by the current supplied from the FP. The antenna 110 and the electric circuits 120 and 130 may receive radio waves, such as Radio Frequency (RF) signals, in the air or may radiate the radio waves into the air due to the transmission line circulated as described above.

Main elements of the PIFA performing the above-mentioned configuration and operation may be related to bandwidth, a return loss in a resonance frequency, impedance matching efficiency, and the like. At this time, the resonance frequency of the antenna apparatus having a configuration according to the present exemplary embodiment may be affected by a physical length of the antenna 110. A resonance may be generated in a specific frequency by the length of the antenna 110. Here, since the resonance of the antenna 110 may be determined by the physical length of the antenna 110, when the resonance frequency is to be changed, the change may be implemented by tuning the length of the antenna 110. However, a method of tuning the length of the antenna according to the present exemplary embodiment should be performed by the tuning of a mold of the antenna 110. Therefore, the small antenna apparatus according to the exemplary embodiment may vary at least one of the electric circuits 120 and 130 in order to increase an electrical length to the same physical length of the antenna 110, thereby making it possible to move the resonance frequency. Therefore, the small antenna apparatus, according to the present exemplary embodiment, may increase the electrical length while reducing the length of the antenna 110 by using at least one of the electric circuits 120, 130 and 140, such that the size of the antenna apparatus may be further reduced. In addition, the resonance frequency of the antenna apparatus may be easily changed by controlling at least one of the electric circuits 120, 130, and 140.

To this end, the PIFA, according to the present exemplary embodiment, may connect the electric circuits 120 and 130 to both ends of asymmetrical antenna pattern 110 that is printed on the PCB. Here, the electric circuits 120 and 130 may allow for a decrease in the physical length of the antenna 110 by improving the input impedance while increasing the electrical wavelength of the antenna apparatus. In this case, the electric circuits 120 and 130 may be implemented on the PCB 150. In addition, in the present exemplary embodiment, the electric circuit 140 for improving the input impedance may be inserted between the antenna 110 and the feeding line. Here, the electric circuits 120, 130 and 140 may be an inter-digital circuit, a lumped element, a chip element, or any other suitable and/or similar electric circuit. That is, the electric circuits 120, 130 and 140 may be configured to include an inductor L, a capacitor C, or a combination of the inductor L and the capacitor C, a circuit configured of a diode, a FET, and a BJT that are active devices, and/or a circuit configured of a combination of RF passive and active devices or a combination of the inter-digital circuits, and/or any other suitable and/or similar circuit elements.

In the PIFA of the exemplary embodiment of FIG. 1, the electric circuit 120 connected between the shorting point and the antenna 110 uses a capacitor. The electric circuit 130 connected between the antenna 110 has the largest energy and uses an inductor. A case in which the inter-digital circuit is used between the FP and the antenna 110 is shown in FIG. 1.

Figure 2:
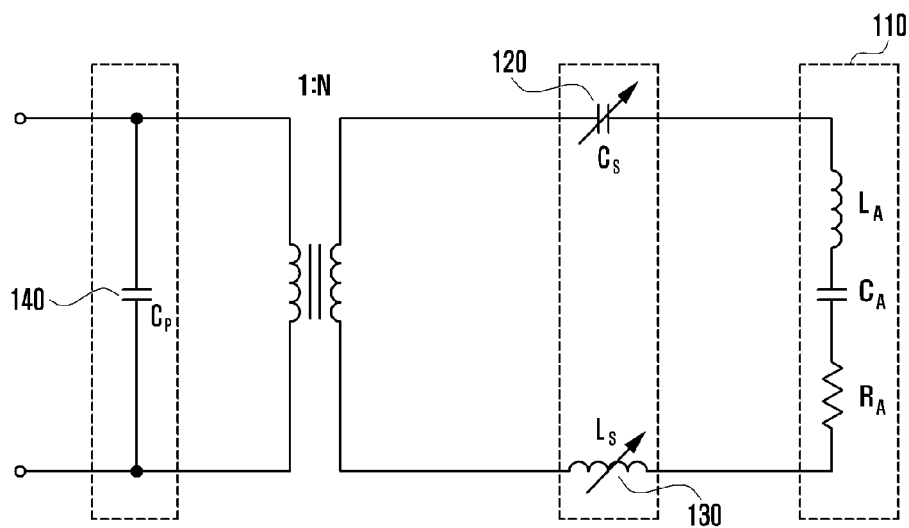
FIG. 2 is diagram illustrating a configuration of an equivalent circuit of a small antenna having a configuration such as the configuration shown in FIG. 1 according to an exemplary embodiment of the present invention.

FIG. 2 is diagram illustrating a configuration of an equivalent circuit of a small antenna having a configuration such as the configuration shown in FIG. 1 according to an exemplary embodiment of the present invention.

Referring to FIG. 2, the resonance of the antenna apparatus may be most affected by the physical length of the antenna 110. Since the change of the length of the antenna 110 may cause a change in an inductor $L_A$, a capacitor $C_A$, and a resistor $R_A$, the resonance may generated at a specific frequency. The physical length of the resonance in the general PIFA is a ¼ wavelength. In the present exemplary embodiment, the electric circuit 140 may vary the input matching because it is connected to the feeding line of the antenna 110. Each of the electric circuits 120 and 130 may be disposed at both ends of the antenna pattern 110, which includes the inductor $L_A$, the capacitor $C_A$, and the resistor $R_A$, to compensate the change of the physical length, thereby making it possible to have the resonance frequency be at a specific frequency. At this time, an equivalent circuit model of FIG. 2 shows that the electric circuit 140 may include a capacitor Cp and each of electric circuits 120 and 130 include a capacitor Cs and an inductor Ls.

The electric circuit 140 in the small antenna apparatus may match the input impedance of the feeding line. In addition, the electric circuits 120 and 130, which are positioned at both sides of the antenna 110, may reduce the size of the ground and the length of the antenna 110. The electric circuit 120 may perform the function matching the input impedance of the antenna 110. Therefore, in the small antenna apparatus, according to the present exemplary embodiment, having the configuration as described above, the electric circuits 120 to 140 may be connected to both ends of the antenna 110 and a feeding line, such that the electrical wavelength and the input impedance may be simultaneously improved. Although FIG. 2 shows that both the electric circuit 120 and 130 are implemented as variable electric circuit, the present invention is not limited thereto, and only one of the electric circuits 120 and 130 may be implemented as variable electric circuit.

Figure 3:
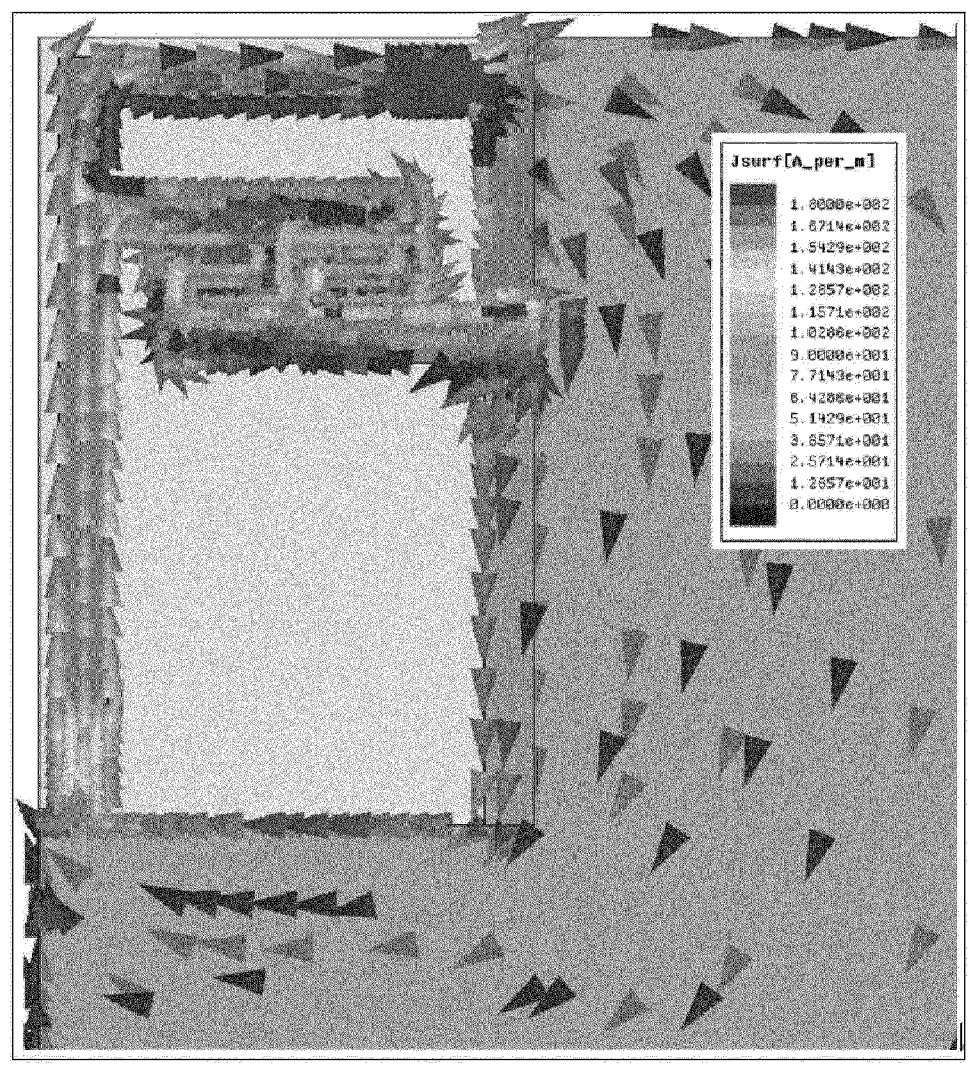
FIG. 3 is a diagram illustrating a flow of current in an antenna at a time of resonance generation in a small antenna apparatus according to an exemplary embodiment of the present invention.

FIG. 3 is a diagram illustrating a flow of current in an antenna at a time of resonance generation in a small antenna apparatus according to an exemplary embodiment of the present invention.

Referring to FIG. 3, when the current is supplied into the FP, the current may be introduced to the antenna 110 through the feeding line and electric circuit 140 and the current flowing through the antenna 110 has a largest energy and is radiated in the electric circuit 130. In addition, the antenna apparatus forms a transmission line circulating the antenna 110, the electric circuit 130, the system ground of the PCB 150, and the electric circuit 120 by the current supplied to the FP. Accordingly, the resonance frequency, as determined by the length of the antenna 110 and the electric circuits 120 and 130, may be generated. At this time, as shown in FIG. 3, a maximum energy is discharged at an end portion of the antenna 110 of the antenna apparatus.

FIG. 3 shows a flow of electricity when tuning of electric circuits is completed after fixing a length of an antenna, and shows that resonance point tuning through an electric circuit may be performed according to an exemplary embodiment of the present invention. Accordingly, the small antenna apparatus, according to the present exemplary embodiment, may change the resonance frequency using the electric circuit, such as the electric circuits 120, 130 and 140, other than the physical length of the antenna 110. Thus, there may be no need to modify the mold due to a pattern correction of the antenna 110 not being necessary.

Figure 4:
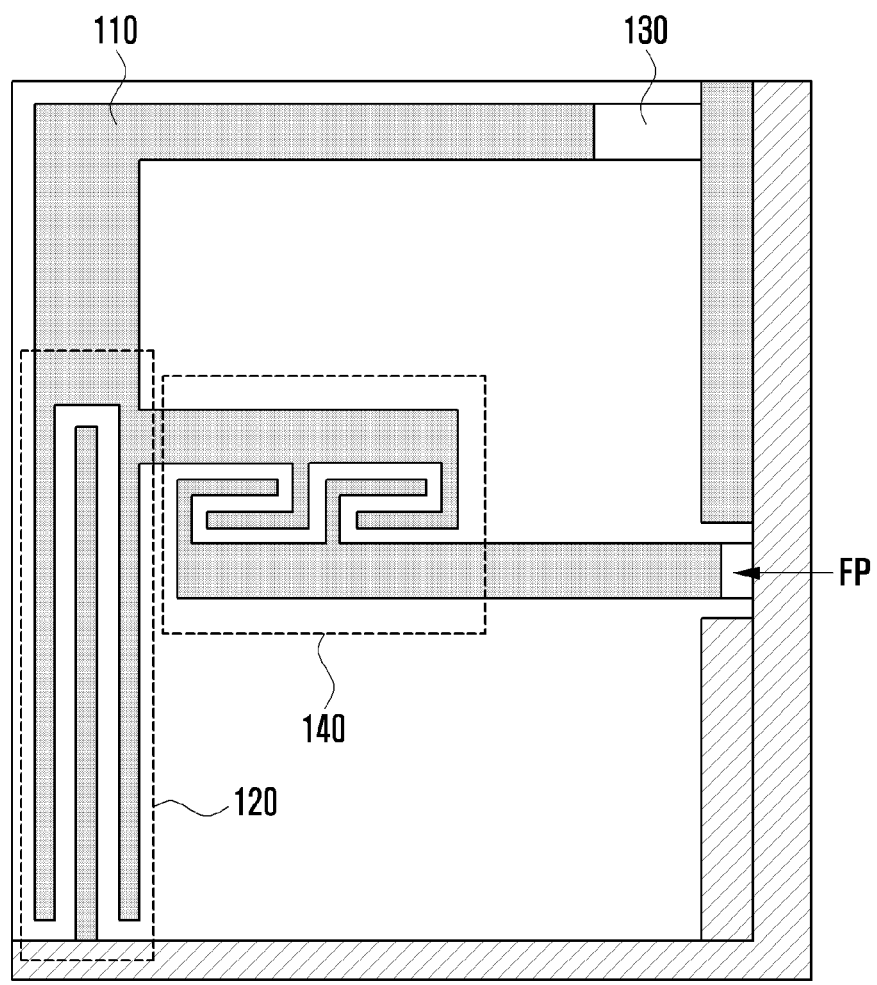
FIG. 4 is a diagram illustrating a structure of a small antenna having another structure printed on a PCB according to an exemplary embodiment of the present invention.

FIG. 4 is a diagram illustrating a structure of a small antenna having another structure printed on a PCB according to an exemplary embodiment of the present invention.

Referring to FIG. 4, another structure of the PIFA is shown. The electric circuits 120 and 130 may be connected to the both ends of the antenna 110 and the PCB 450. A feeding line connected to the FP is connected to an antenna 410 through an electric circuit 140. Here, the configurations are the same as the PIFA structure of FIG. 1 except that the electric circuit 120 is configured by an inter-digital circuit. The inter-digital circuit may have a parasitic parameter smaller than a chip inductor and the capacitor. Thus, it may be manufactured with a low tolerance. Therefore, when the inter-digital circuit is used, the tuning of the frequency may be more accurately performed than when the chip circuit is used, in the same environment. The parasitic parameter may be reduced to have a wide bandwidth, thereby making it possible to reduce a manufacturing cost. Generally, the shorting point of the antenna 110 has a characteristic that the frequency may be significantly changed even for a change of a fine value. The electric circuit 120 connected to the shorting point of the antenna 110 may use the inter-digital structure.

Figure 5:
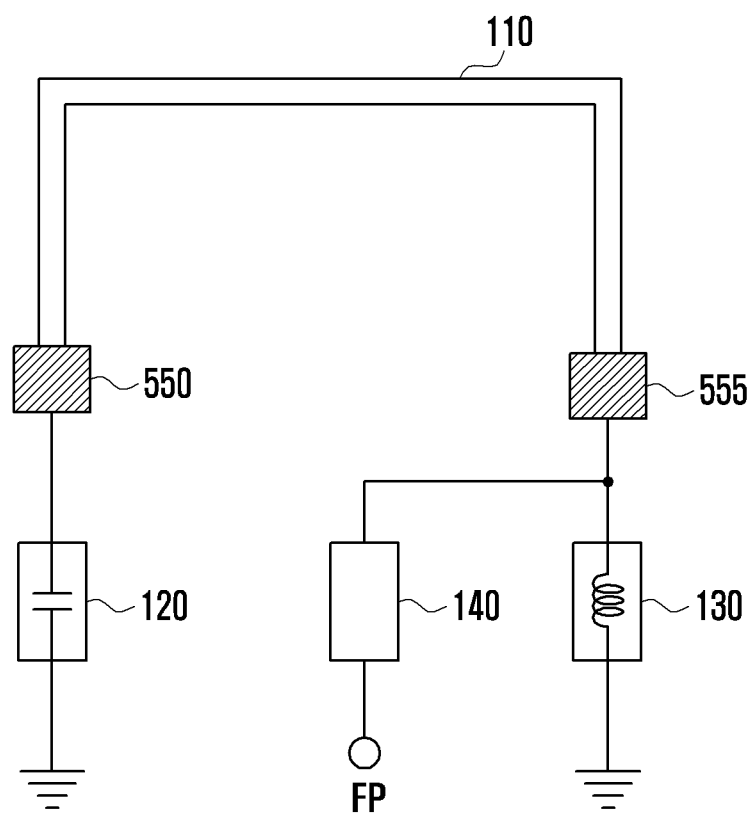
FIG. 5 is a diagram illustrating a structure of a small antenna having a configuration of an antenna apparatus when an antenna is attached to a specific tool of a mobile terminal according to an exemplary embodiment of the present invention.

FIG. 5 is a diagram illustrating a structure of a small antenna having a configuration of an antenna apparatus when an antenna is attached to a specific tool of the mobile terminal according to an exemplary embodiment of the present invention.

Referring to FIG. 5, although the antenna 110 is shown with a form which is horizontally symmetrical, the present invention is not limited thereto, and the antenna 110 and may be formed as an appropriate asymmetrical antenna according to characteristics of tool disposition.

The antenna 110, which may be formed of a metal conductor, may be attached to a specific tool of the apparatus, which may be a mobile terminal Both ends of the antenna 110 are connected to the PCB through a pad 550 and 555, respectively. In addition, the electric circuit 120 is connected to the pad 550 and the electric circuits 140 and 130 are connected to the pad 555. In addition, each of the other ends of the electric circuits 120 and 130 is connected to the system ground and the other end of the electric circuit 140 is connected to the FP. As shown in FIG. 5, the antenna apparatus has a structure in which the antenna 110 is attached to the specific tool and both ends of the antenna 110 are connected to the electric circuits 120, 130 and 140 positioned on the PCB through the pad 550 and 555.

As shown in FIG. 5, the antenna 110 may be a conductor made of a metal material and may be manufactured according to the space characteristics of the tool. That is, the antenna 110 may be configured as a pattern having a symmetric or an asymmetric form as the metal material and may be formed in the appropriate form according to the space characteristics of the tool in the apparatus. Further, both ends of the antenna 110 are connected to the PCB through the pads 550 and 555. As shown in FIGS. 1 and 4, the PCB may extend the electrical length of the antenna and may include the electric circuits 120, 130 and 140, which may match the input impedance of the antenna 110. The electric circuits 120, 130, and 140 are connected to the antenna 110 through the pads 550 and 555. Therefore, the antenna apparatus may have a structure in which the antenna 110 is attached to the specific tool and to the circuit at respective sides of the antenna 110 and the feeding line of the antenna 110 is shorted by the electric circuits 120, 130 and 140 that are connected to the PCB.

The antenna apparatus may be formed in a manner similar to that of the antenna apparatus of FIG. 1. An equivalent circuit of the antenna apparatus having the configurations shown in FIGS. 4 and 5 has the configuration as shown in FIG. 2. The flow of current at the time of the resonance generation has the flow as shown in FIG. 3.

As shown in FIGS. 1, 4, and 5, the antenna apparatus, according to the present exemplary embodiment, is not limited by a shape of the antenna pattern or a position on the PCB, on a carrier, or the outside tool of a mobile phone, or the like, at which the antenna apparatus is disposed. The change of the characteristics such as a movement of the resonance generating point due to a difference of a dielectric constant may be easily solved by tuning of the electric circuit. The electric circuit 120 in FIGS. 1, 4, and 5 may be a first electric circuit, the electric circuit 130 may be a second electric circuit, and the electric circuit 140 may be a third electric circuit. In FIG. 5, the pads 550 and 555 are a pad in which the antenna 110 and the PCB are connected to each other. The pad 550 may be a first pad and the pad 555 may be a second pad.

Figure 6:
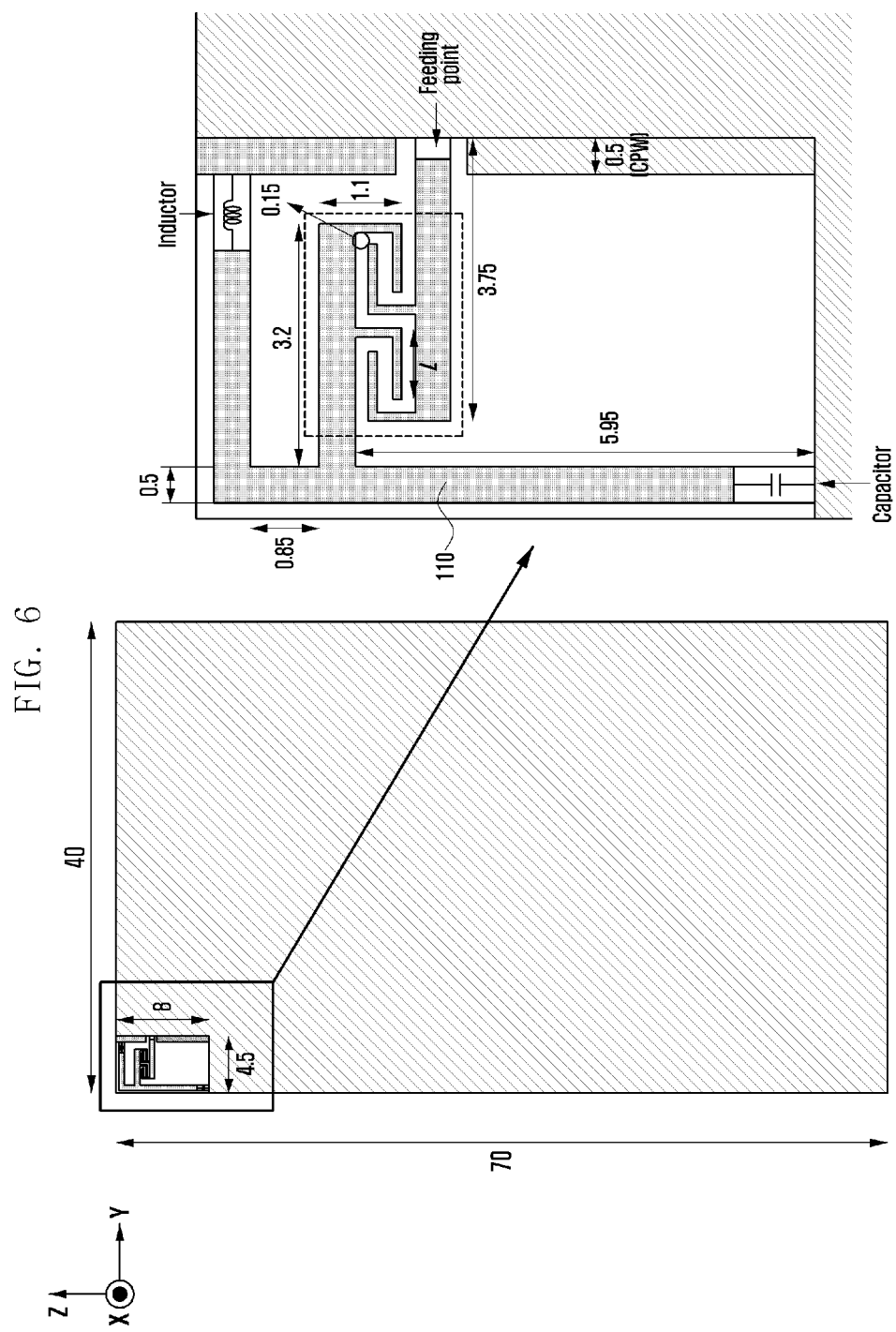
FIG. 6 is a diagram illustrating a small antenna apparatus in which input impedance and a length of an antenna are matched to each other by connecting an electric circuit to both ends and a feeding ends of the antenna according to an exemplary embodiment of the present invention.

FIG. 6 is a diagram illustrating a small antenna apparatus in which input impedance and a length of an antenna are matched to each other by connecting an electric circuit to both ends and a feeding ends of an antenna according to an exemplary embodiment of the present invention. The FIG. 6 illustrates the antenna apparatus in the PIFA structure.

Referring to FIG. 6, the antenna of the PIFA type may be implemented in the size of 8 mm*4.5 mm in the PCB having a dielectric constant of 4.4, a thickness of 0.8 mm, and a size of 70 mm*40 mm. In addition, both ends of the antenna of the PIFA type are connected to the electric circuit, which may be a lumped element and inter-digital structure. Here, the antenna apparatus of FIG. 6 illustrates that a capacitor is connected to a shorting point of the antenna 110 and an inductor is connected to the other end having the maximum energy of the antenna 110 when the electric circuit is connected to the antenna apparatus. Also, a meander line length L is shown. In this case, when an inductance and a capacitance are increased, the antenna apparatus may use circuit resonance instead of wave resonance, such that the resonance frequency moves to a low frequency band. Accordingly, the inductance and the capacitance may vary the operating frequency of the antenna 110. Hence, performance of the antenna 110 may be improved.

Figure 7A:
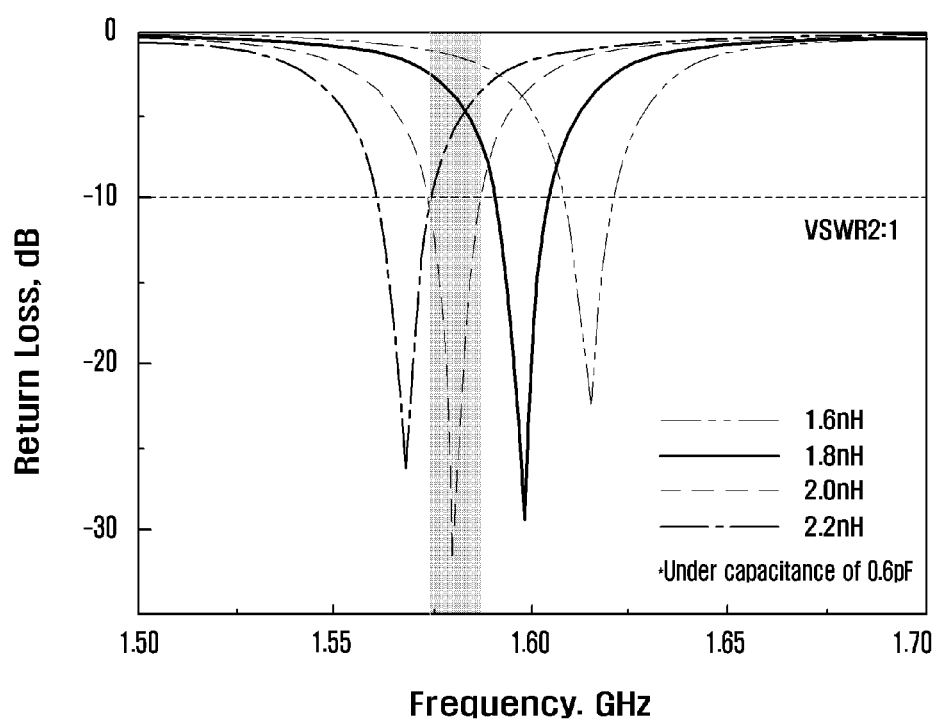
FIGS. 7A and 7B are diagrams illustrating change characteristics of a resonance point due to a change of an electric circuit connected to both ends of an antenna in an antenna apparatus having a structure such as that shown in FIG. 6 according to an exemplary embodiment of the present invention.
Figure 7B:
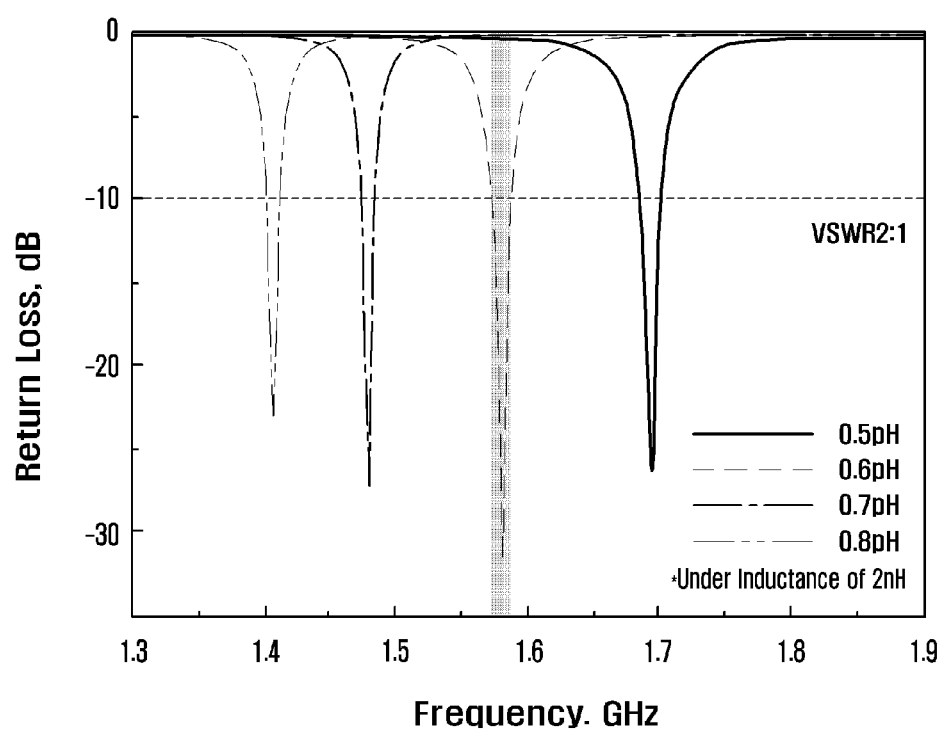

FIGS. 7A and 7B are diagrams illustrating change characteristics of a resonance point due to a change of an electric circuit connected to both ends of an antenna in an antenna apparatus having a structure such as that shown in FIG. 6 according to an exemplary embodiment of the present invention.

Referring to FIG. 7A, change characteristics of return loss of the antenna due to the change of inductance are illustrated. Referring to FIG. 7B, change characteristics of return loss of the antenna due to the change of capacitance are illustrated. The change characteristics illustrated in FIGS. 7A and 7B may acquire an optimum return loss in the inductance of 2.0 nH and the capacitance of 0.6 pF, respectively.

Figure 8:
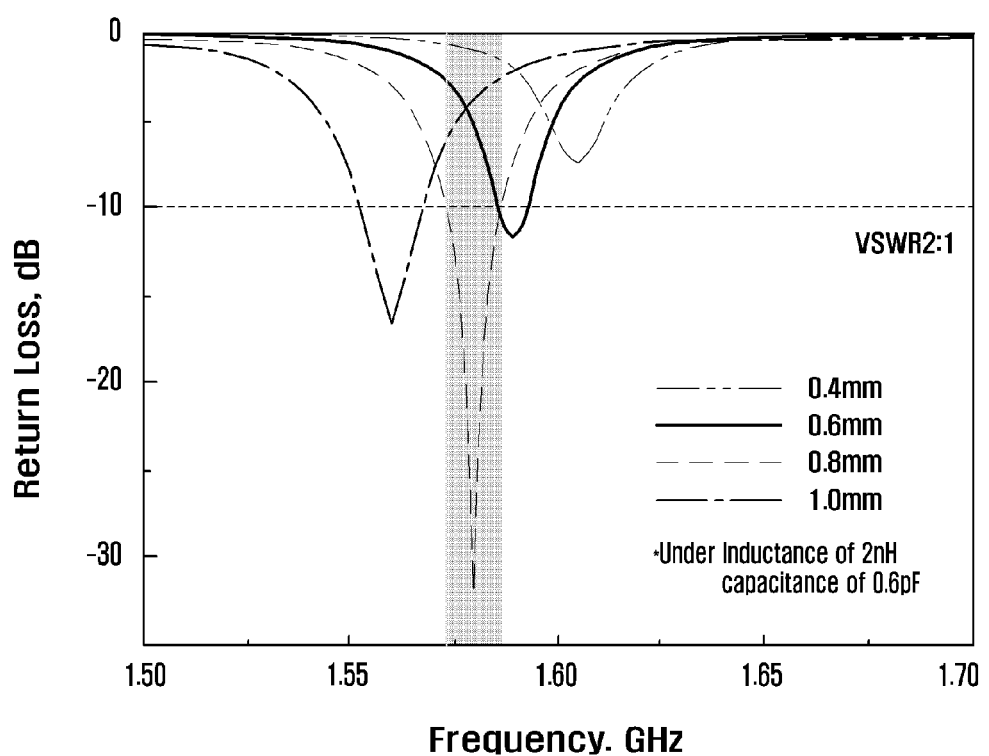
FIG. 8 is a diagram illustrating change characteristics of return loss due to a change of an electric circuit connected to a feeding point of an antenna apparatus having a structure such as that shown in FIG. 6 according to an exemplary embodiment of the present invention.

FIG. 8 is a diagram illustrating change characteristics of return loss due to a change of an electric circuit connected to a FP of an antenna apparatus having a structure such as that shown in FIG. 6 according to an exemplary embodiment of the present invention.

Referring to FIG. 8, the electric circuit of the FP uses the inter-digital structure. The inter-digital structure affects the input impedance and operating frequency of the antenna. At this time, when a meander line length L (see FIG. 6) is increased, the impedance also increases due to the inter-digital structure. In FIG. 8, in a case where the meander line length L is 0.8 mm long, good impedance matching of an input port may be achieved.

As shown in FIGS. 7A and 7B, when the pattern of the antenna 110 is fixed, the shorted electric circuits 120 and 130 are connected to both ends of the antenna 110, and the device values, i.e. characteristics, of the electric circuits 120 and 130 are changed, it may be appreciated that the resonance point of the antenna 110 is changed. As shown in FIG. 8, when the device value of the electric circuit 140, which is connected to the feeding line, is changed, then the return loss of the resonance frequency adjusted by the electric circuits 120 and 140, which are connected to both ends of the antenna 110, may also be increased.

Figure 9:
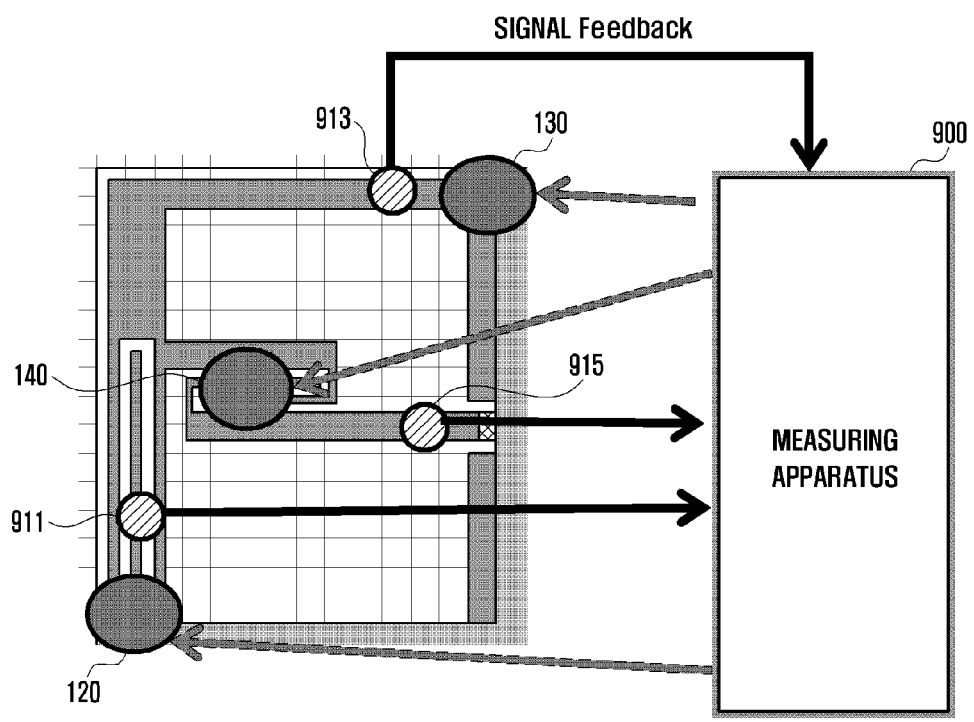
FIG. 9 is a diagram illustrating a configuration of changing an electric circuit in an antenna apparatus according to an exemplary embodiment of the present invention.
Figure 10:
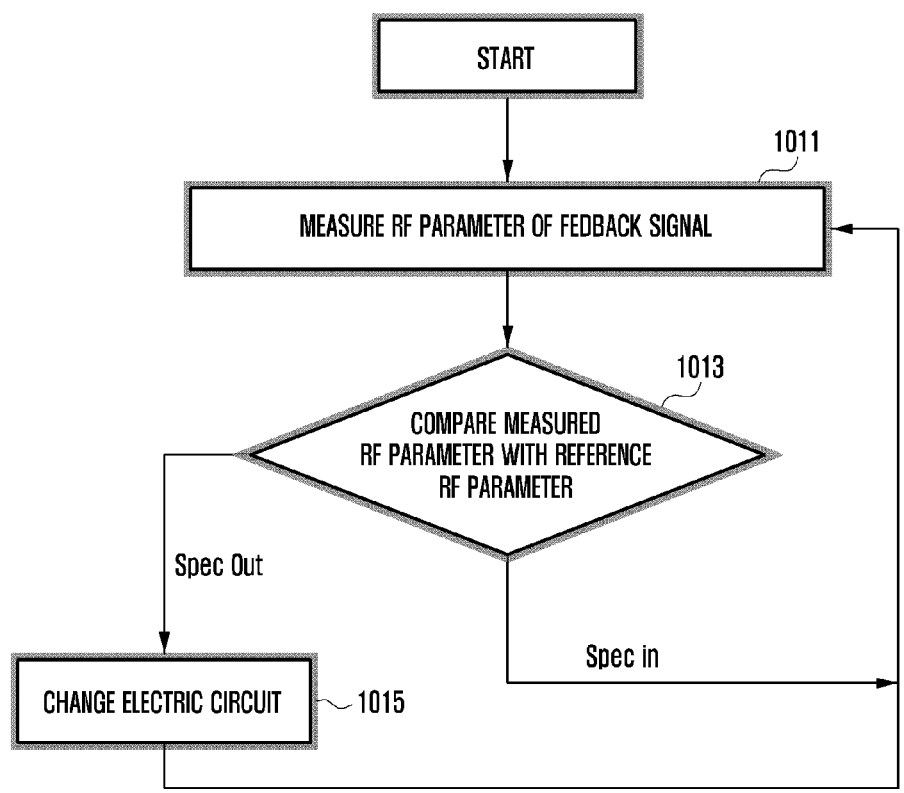
FIG. 10 is a flowchart illustrating a procedure of changing an electric circuit of an antenna apparatus such as that shown in FIG. 9 according to an exemplary embodiment of the present invention.

FIG. 9 is a diagram illustrating a configuration of changing an electric circuit in an antenna apparatus according to an exemplary embodiment of the present invention according to an exemplary embodiment of the present invention, and FIG. 10 is a flowchart illustrating a procedure of changing an electric circuit of an antenna apparatus such as that shown in FIG. 9 according to an exemplary embodiment of the present invention.

Referring to FIGS. 9 and 10, a measuring apparatus 900 measures operations of each portion of the antenna apparatus and the antenna apparatus may have the configuration such as those shown in FIG. 1, 4 or 5. In the present exemplary embodiment of FIG. 9, the antenna apparatus has the configuration as shown in FIG. 4.

First, the measuring apparatus 900 provides feedback of at least one signal from among signals of a position proximate to each of the electric circuits 120, 130, and 140 of the antenna apparatus in order to determine an optimum frequency channel or calibration of process. At this time, the position at which the measuring apparatus 900 inputs the feedback signal may be a position 911 of the antenna 110 close to the electric circuit 120 connected between the shorting point and antenna 110, a position 915 of the antenna 110 close to the electric circuit 130 positioned at an end of the antenna 110, and/or a position 913 of the feeding line between the electric circuit 140 and feeding point. The measuring apparatus 900 inputting the feedback signal of at least one of the positions 911, 913 and 915 measures RF parameters, such as Total Isotropic Sensitivity (TIS), Total Radiated Power (TRP), Bit-Error-Rate (BER), gain, efficiency, and other similar and/or suitable RF parameters, using the feedback signal. At this time, the measuring apparatus 900 stores a reference value of a preset RF parameter and compares the measured RF parameter with the reference value. When the comparison result is not the set frequency, i.e. a spec out occurs which happens when the result is outside of the specification, the measuring apparatus 900 changes the device value of at least one of the electric circuits 120, 130 and 140 in order to change the resonance frequency.

In other words, and while referring to FIG. 10, after inputting the feedback signal of at least one of the positions 911, 913, and 915, the measuring apparatus 900 measures the RF parameter of the feedback signal at operation 1011. Thereafter, the measuring apparatus compares the measured RF parameter with a preset reference RF parameter at operation 1013. In this time, when the antenna apparatus generates a resonance frequency deviating from a set specification, i.e., the spec out event occurs, then the measuring apparatus 900 senses it the deviation of the resonance frequency at operation 1013, and changes at least one of the electric circuits 120, 130 and 140 at operation 1015. The operations 1011, 1013, and 1015 may be repeated until the antenna apparatus generates the resonance frequency within the set specification. Moreover, when the antenna apparatus generates the resonance frequency within the set specification, i.e. a spec in event occurs, at operation 1013, then the measuring apparatus 900 returns to operation 1011 without performing the adjustment operation 1015 that is for the changing of the electric circuits 120, 130 and 140. As discussed, above, the small antenna apparatus having the configurations shown in FIGS. 1, 4, and 5 may be mounted in the mobile terminal.

Figure 11:
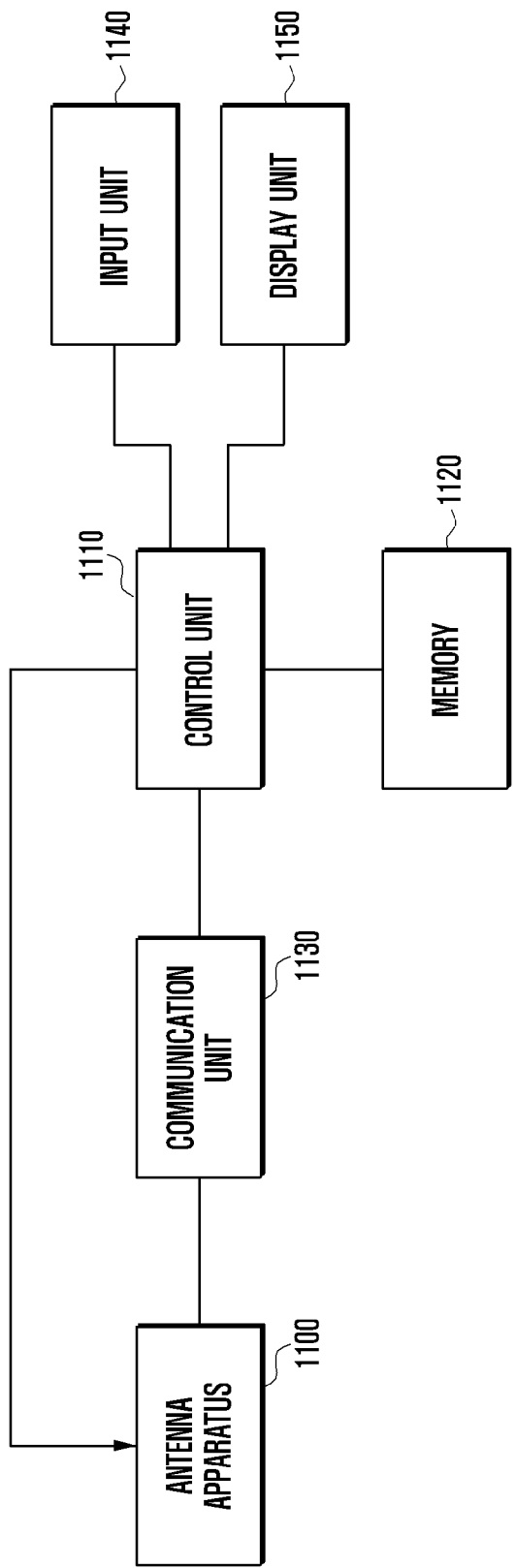
FIG. 11 is a diagram illustrating a configuration of a mobile terminal having a small antenna apparatus according to an exemplary embodiment of the present invention.

FIG. 11 is a diagram illustrating a configuration of a mobile terminal in which a small antenna apparatus according to an exemplary embodiment of the present invention.

Referring to FIG. 11, an antenna apparatus 1100 may have the configuration such as that shown in FIGS. 1, 4, and 5. That is, the antenna apparatus 1100 has a structure in which each of the electric circuits 120, 130 and 140 are connected to both ends of the antenna pattern and/or the feeding line to which signal is supplied. The antenna 1100 may be an antenna pattern implemented on the PCB 150 or an antenna pattern of the metal material attached to the tool. Further, the antenna 1100 may be asymmetrically formed based on the feeding line for free mounting. The electric circuits 120, 130 and 140 may be circuits including an electric device such as a passive device and an active device for generating electrical resonance. The electric device may be implemented as a chip type, a package type or an inter-digital structure implemented on the PCB.

In addition, the antenna apparatus 1100 receives and transmits a frequency of set bandwidth. Accordingly, the antenna apparatus 1100 may be an antenna for communication networks such as an LTE network, a WCDMA network, a Global System for Mobile communications (GSM) network, and any other similar and/or suitable communication network type, in the case of antenna communicating with a base station, an antenna for communication networks such as a WiFi network, a Wibro network, and any other similar and/or suitable communication network type, in the case of antenna for communicating with the Internet network, or an antenna for communication networks such as an NFC network, a Bluetooth network, and any other similar and/or suitable communication network type, in the case of antenna communicating for near field communication. In the present exemplary embodiment, for convenience of explanation, it is assumed that the antenna apparatus 1100 is an antenna for base station communication. In this case, the antenna apparatus 1100 may be connected to a base station communication unit 1130. However, when the antenna apparatus 1100 is not the antenna for base station communication, then the antenna apparatus 1100 is not connected to the base station communication unit 1130.

The communication unit 1130 performs a wireless communication with the base station. Here, the communication unit 1130 may include a transmission unit for up-converting a frequency of a transmission signal and for amplifying a power and may also include a reception unit for low-noise amplifying a received signal and down-converting a frequency of the received signal. In addition, the communication unit 1130 may include a modulator and a demodulator. Here, the modulator modulates the transmission signal and transfers it to the transmission unit. The demodulator demodulates the signal received through the reception unit. In this case, the modulator/demodulator may be for any type of communication network.

A control unit 1110 controls the overall operation of the mobile terminal. According to the present exemplary embodiment, the control unit 1110 confirms an RF parameter transmitted from the base station and changes the device value of the electric circuit of the antenna apparatus 1100 when the RF parameter is not a reference RF parameter.

A memory 1120 may include a program memory that stores an Operating System (OS) program of the terminal and a program according to the exemplary embodiments of the present invention as well as any other similar and/or suitable programs for the mobile terminal, and a data memory that stores tables for operation of the mobile terminal and data generated when performing a program. Particularly, the memory 1120 may include a change table that stores a reference RF parameter of the present invention and a control data for changing the device value of the electric circuit of the antenna apparatus 1100.

In addition, the control unit 1110 may control the device value in an active type which gradually changes the device value until it satisfies a specification, which is the reference value, due to characteristics of the wireless channel that does not have noise or a predetermined pattern. In this case, the memory 1120 does not include the change table. That is, when changing the device value of electric circuit of the antenna apparatus 1100, the control unit 1110 may use a first method of using a device value change table of the memory 1120. In addition, it may use a second method of determining a value satisfying the specification by gradually changing the device value without use of the device value change table.

A display unit 1150 may be any suitable display device, such as a Liquid Crystal Display (LCD) or an Organic Light Emitting Diode (OLED) display panel, for displaying the data, an image, and the like, that may be generated when performing operations of the programs under the control of the control unit 1110. An input unit 1140, which is a touch panel, senses a touch input of a user and transfers it to the control unit 1110. However, the present invention is not limited thereto, and the input unit 1140 may be the touch panel or any other similar and/or suitable input device. Here, the input unit 1140 and the display unit 1150 may be all-in-one touch screen.

The mobile terminal having the configuration of the present exemplary embodiment receives the RF parameter from the base station and changes the device value of at least one of the electric circuits 120, 130, and 140 of the antenna apparatus 1100, thereby making it possible to adjust the resonance frequency. That is, when the mobile terminal is calibrated in a manufacturing process and mounted in the mobile terminal, the frequency resonance value of the antenna apparatus may be changed by external and internal environments. In this case, the antenna apparatus 1100 of the present of the present exemplary embodiment may change the device value of the internal electric circuits 120, 130 and 140 and may generate a desired resonance frequency. At this time, the mobile terminal may change the resonance frequency of the antenna apparatus 1100 using the signal received from the base station. In addition, the mobile terminal may measure an output of the antenna apparatus 1100 by itself, such that the resonance frequency of the antenna apparatus 1100 may be changed.

In the case of the first method, the base station measures the RF parameter such as TIS, TRP, BER, gain, efficiency, or the like from the signal transmitted from the mobile terminal and transmits it to the mobile terminal so as to change the frequency of the antenna in order to search the optimal frequency channel. In addition, the mobile terminal compares the reference RF parameter stored in the memory 1120 with the received RF parameter in order to change the electric circuit of the antenna apparatus 1100 when needed, such that the resonance frequency of the antenna apparatus 1100 is changed. In the case of the second method, as shown in FIG. 9, the control unit 1110 of the mobile terminal measures a feedback signal in each position 911, 913 and 915 of the antenna apparatus 1100 in order to obtain the RF parameter, and compares it with the stored reference RF parameter in order to change the electric circuit of the antenna apparatus 1100.

Figure 12:
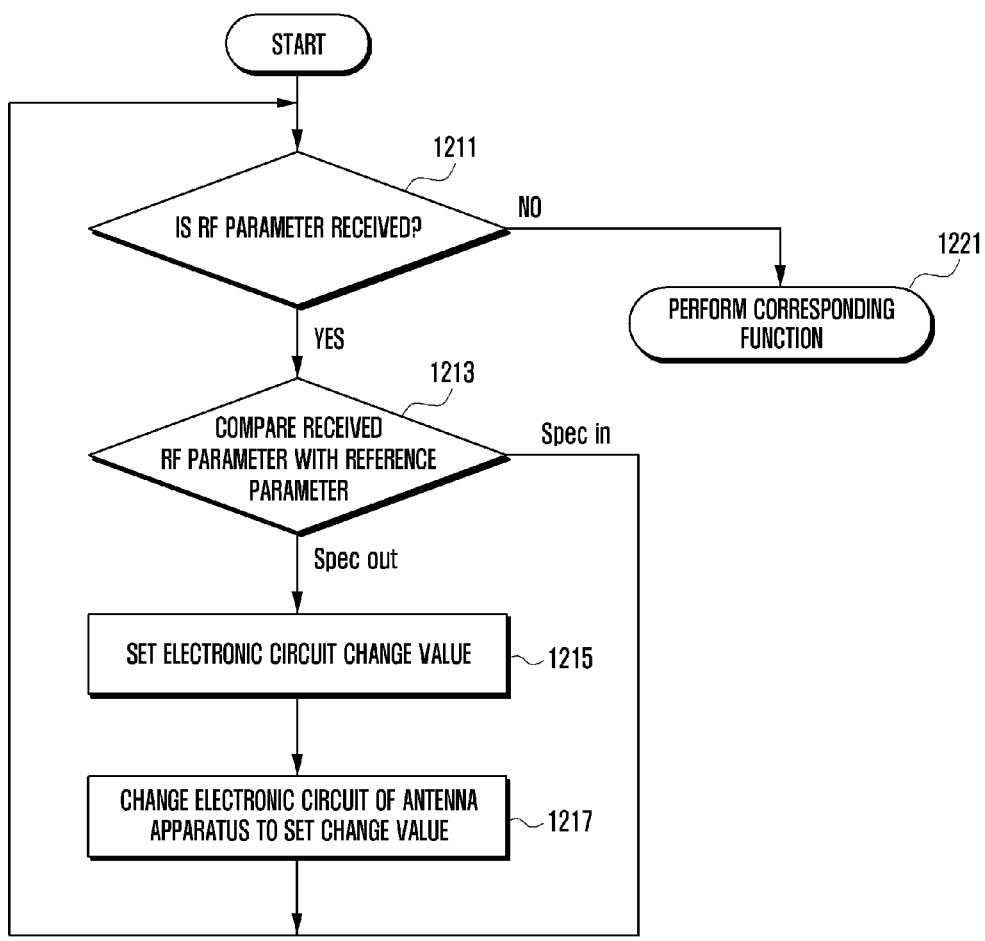
FIG. 12 is a flowchart illustrating a procedure of changing a resonance frequency of an antenna apparatus in a mobile terminal according to an exemplary embodiment of the present invention.

FIG. 12 is a flowchart illustrating a procedure of changing a resonance frequency of an antenna apparatus in a mobile terminal according to an exemplary embodiment of the present invention.

Referring to FIG. 12, the resonance characteristic of the antenna apparatus 1100 is shown to be changed by receiving the RF parameter from the base station. When the RF parameter is received from the base station, the control unit 1110 senses it at operation 1211, and compares the reference RF parameter stored in the memory 1120 with the received RF parameter at step 1213. Here, when the received RF parameter deviates from a range of the set reference parameter, i.e., the spec out occurs, and then the control unit 1110 senses it at operation 1213. After accessing corresponding change data in the change table of the memory 1120 at operation 1215, the control unit 1110 changes a corresponding device value of the electric circuit from among the electric circuits 120, 130 and 140 of the antenna apparatus 1100 at operation 1217. Then, the antenna apparatus 1100 generates resonance with a frequency of the band set by the electric circuit having the changed device value. Additionally, at operation 1211, if no RF parameter is received, then a corresponding function is performed at operation 1221.

At this time, the change of the device value of the electric circuit of the antenna apparatus 1100 may be set in the electric circuits 120, 130 and 140, two of the electric circuits 120 to 140, or any one of the electric circuits 120, 130 and 140. In addition, the change table of the memory 1120 may store the device change value of the set electric circuit corresponding to the difference of the reference RF parameter and the received RF parameter. Therefore, when the device value of the electric circuits 120, 130 and 140 is changed at operation 1215, the control unit 1110 determines a difference value between the reference RF parameter and the received RF parameter, and retrieves the device value of the electric circuit of the change table corresponding to the calculated difference value in order to change a corresponding device value of the electric circuit of the antenna apparatus 1100.

As described above, the memory 1120 may not include the device value change table. In this case, when a comparison value of two parameters deviates from the reference specification, the control unit 1110 changes the device value of the electric circuit of the antenna apparatus 1100. At this time, the control unit 1110 may change the corresponding device value of the electric circuit of the antenna apparatus 1100 until the specification of the reference RF parameter is satisfied. That is, the control unit 1110 may set the change value in a passive type electronic device by previously setting the change value, or gradually may change the device value in an active type electronic device until the specification, which is a reference value, is satisfied due to characteristics of the wireless channel that does not have noise or a predetermined pattern. That is, the control unit 1110 may use a device value change table. On the other hand, when the device value change table does not exist, it may search a value satisfying the spec by gradually changing the value.

As discussed above, FIG. 12 illustrates an operation procedure for receiving the RF parameter from the base station. However, as shown in FIG. 9, the control unit 1110 may feedback an output of the antenna apparatus 1100 in order to measure the RF parameter. In this case, the control unit 1110 provides feedback of the output of the antenna apparatus 1100 in order to measure the RF parameter at operation 1211, and then compares it with the stored reference RF parameter at operation 1213. Then, after operation 1213, the remaining the remaining operations 1215 and 1217 may be performed as described above.

The small antenna apparatus according to the exemplary embodiments discussed above has antenna pattern provided in the PCB or tool, connects the electric circuit, which may be at least one of or a combination of an active device and a passive device, on the PCB to the feeding line and to both ends of the antenna, such that the size of the antenna is reduced so as to efficiently utilize the space. Furthermore, a circuit resonance type operation may be used to perform the tuning of the electric circuit connected at the time of changing the resonance point, such that the antenna resonance frequency may be efficiently changed. Accordingly, the antenna apparatus according to the exemplary embodiments discussed above may reduce the antenna mounting space so as to provide a multi-function such that the antenna apparatus may be efficiently applied to the mobile terminal performing various wireless communication functions. In addition, at the time of changing the resonance point, not by using a physical length change of the antenna through the mold, but by tuning the connected electric circuit, the development time and cost of the mobile terminal may be reduced.

While the invention has been shown and described with reference to certain exemplary embodiments thereof, it will be understood those skilled in the art that various changes in form and details may be made therein without departing from the spirit and scope of the invention as defined by the appended claims and their equivalents.

What is claimed is:

1. An antenna apparatus, comprising:
   an antenna pattern;
   a first electric circuit and a second electric circuit respectively connected between both ends of the antenna pattern and a system ground; and
   a third electric circuit disposed between the antenna pattern and a feeding line,
   wherein the first electric circuit, the second electric circuit, and the third electric circuit extend electrical wavelengths of the antenna pattern.

2. The antenna apparatus of claim 1, wherein the antenna pattern is asymmetrically formed based on the feeding line.

3. The antenna apparatus of claim 1, wherein the first electric circuit, the second electric circuit, and the third electric circuit include at least one of a passive device, an active device, and a combination of the passive device and active device.

4. The antenna apparatus of claim 3, wherein the device has at least one of a chip type structure, a package type structure, and an inter-digital structure.

5. The antenna apparatus of claim 4, wherein the first electric circuit is a capacitor connected between a shorting point and an end of the antenna pattern,
   wherein the second electric circuit is a capacitor connected between another end of the antenna pattern and the system ground, and
   wherein the third electric circuit has the inter-digital structure.

6. The antenna apparatus of claim 1, wherein the antenna apparatus is a planar inverted-F antenna.

7. The antenna apparatus of claim 1, wherein the antenna pattern is formed of a metal material,
   wherein an end of the antenna pattern is connected to the first electric circuit through a first pad of a Printed Circuit Board (PCB), and
   wherein another end of the antenna pattern is connected to the second electric circuit and the third electric circuit through a second pad of the PCB.

8. A mobile terminal comprising:
   an antenna apparatus comprising:
      an antenna pattern,
      a first electric circuit and a second electric circuit respectively connected between both ends of the antenna pattern and a system ground, and
      a third electric circuit disposed between the antenna pattern and a feeding line;
   a communication unit configured to receive a radio frequency (RF) parameter from a base station;
   a memory configured to store a reference RF parameter therein; and
   a control unit configured to:
      compare the received RF parameter with the reference RF parameter, and
      change a device value of a corresponding electric circuit, from among the first electric circuit, the second electric circuit and the third electric circuit, of the antenna apparatus until a comparison value between the received RF parameter and the reference RF parameter satisfies a reference specification when the comparison value is not the reference specification,
   wherein the first electric circuit, the second electric circuit, and the third electric circuit extend electrical wavelengths of the antenna pattern.

9. The antenna apparatus of claim 8, wherein the antenna apparatus is a planar inverted-F antenna.

10. The antenna apparatus of claim 8,
   wherein the antenna pattern is formed of a metal material,
   wherein the end of the antenna pattern is connected to the first electric circuit through a first pad of a printed circuit board (PCB), and
   wherein the other end of the antenna pattern is connected to the second electric circuit and the third electric circuit through a second pad of the PCB.

11. A mobile terminal comprising:
   an antenna apparatus comprising:
      an antenna pattern,
      a first electric circuit and a second electric circuit respectively connected between both ends of the antenna pattern and a system ground, and
      a third electric circuit disposed between the antenna pattern and a feeding line;
   a memory configured to store a reference RF parameter therein; and
   a control unit configured to:
      measure an RF parameter which is outputted from the antenna apparatus,
      compare the measured RF parameter with the reference RF parameter, and
      change a device value of a corresponding electric circuit, from among the first electric circuit, the second electric circuit and the third electric circuit, of the antenna apparatus until a comparison value between the measured RF parameter and the reference RF parameter satisfies a reference specification when the comparison value is not the reference specification,
   wherein the first electric circuit, the second electric circuit, and the third electric circuit extend electrical wavelengths of the antenna pattern.

12. The antenna apparatus of claim 11, wherein the antenna apparatus is a planar inverted-F antenna.

13. The antenna apparatus of claim 11,
   wherein the antenna pattern is formed of a metal material,
   wherein an end of the antenna pattern is connected to the first electric circuit through a first pad of a printed circuit board (PCB), and
   wherein another end of the antenna pattern is connected to the second electric circuit and the third electric circuit through a second pad of the PCB.

14. A method for controlling a resonance frequency of an antenna of a mobile terminal, the method comprising:
   receiving a radio frequency (RF) parameter from a base station;
   comparing the received RF parameter with a reference RF parameter stored in a memory of the mobile terminal; and
   changing a device value of a corresponding electric circuit of an antenna apparatus until a comparison value between the received RF parameter and the reference RF parameter satisfies a reference specification when the comparison value is not the reference specification,
   wherein the antenna apparatus includes an antenna pattern, a first electric circuit and a second electric circuit respectively connected between both ends of the antenna pattern and a system ground, and a third electric circuit disposed between the antenna pattern and a feeding line and the first electric circuit, the second electric circuit, and the third electric circuit extend electrical wavelengths of the antenna pattern.

15. A method for controlling a resonance frequency of an antenna of a mobile terminal, the method comprising:
   measuring an output of an antenna apparatus including an antenna pattern, a first electric circuit and a second electric circuit respectively connected between both ends of the antenna pattern and a system ground, and a third electric circuit disposed between the antenna pattern and a feeding line and the first electric circuit, the second electric circuit, and the third electric circuit extend electrical wavelengths of the antenna pattern;
   comparing the measured RF parameter with a reference RF parameter; and
changing a device value of a corresponding electric circuit of the antenna apparatus until a comparison value between the measured RF parameter and the reference RF parameter satisfies a reference specification when the comparison value is not the reference specification.

* * * * *